US007011181B2

(12) United States Patent
Albin, Jr.

(10) Patent No.: US 7,011,181 B2
(45) Date of Patent: Mar. 14, 2006

(54) SOUND INSULATION SYSTEM

(75) Inventor: Donald C. Albin, Jr., Carlisle, PA (US)

(73) Assignee: Lear Corporation, Southfield, MI (US)

( * ) Notice: Subject to any disclaimer, the term of this patent is extended or adjusted under 35 U.S.C. 154(b) by 293 days.

(21) Appl. No.: 10/614,907

(22) Filed: Jul. 8, 2003

(65) Prior Publication Data
US 2005/0006173 A1 Jan. 13, 2005

(51) Int. Cl.
E04B 1/82 (2006.01)
E04B 2/02 (2006.01)
F01N 1/24 (2006.01)
F01N 1/02 (2006.01)
B60R 13/08 (2006.01)

(52) U.S. Cl. ............... 181/290; 181/293; 181/204; 296/39.3

(58) Field of Classification Search ........... 181/290, 181/293, 204, 205, 210; 296/39.3; 180/69.22, 180/69.23
See application file for complete search history.

(56) References Cited

U.S. PATENT DOCUMENTS

| 2,069,413 | A |   | 2/1937  | Leadbetter |
| 2,192,516 | A | * | 3/1940  | Cunnington ............ 428/158 |
| 2,419,971 | A | * | 5/1947  | Rumpf et al. ........... 428/188 |
| 2,973,295 | A | * | 2/1961  | Rodgers, Jr. ........... 428/160 |
| 3,679,533 | A | * | 7/1972  | Fukuda et al. ............ 428/95 |
| 4,111,733 | A |   | 9/1978  | Periers |
| 4,131,664 | A |   | 12/1978 | Flowers et al. |
| 4,199,635 | A |   | 4/1980  | Parker |
| 4,362,222 | A | * | 12/1982 | Hellstrom ................ 181/30 |
| 4,410,577 | A |   | 10/1983 | Palmer et al. |
| 4,479,992 | A |   | 10/1984 | Häeseker et al. |
| 4,576,853 | A |   | 3/1986  | Vaughn et al. |
| 4,581,272 | A |   | 4/1986  | Walters et al. |
| 4,655,496 | A |   | 4/1987  | Gahlau et al. |
| 4,705,139 | A | * | 11/1987 | Gahlau et al. ........... 181/290 |
| 4,735,427 | A |   | 4/1988  | Fuchs |
| 4,798,756 | A |   | 1/1989  | Fukushima et al. |
| 4,818,586 | A |   | 4/1989  | Smith et al. |
| 4,917,431 | A |   | 4/1990  | McDonald |
| 4,945,682 | A |   | 8/1990  | Altman et al. |
| 5,014,815 | A | * | 5/1991  | Arcas et al. ............. 181/213 |
| 5,076,870 | A |   | 12/1991 | Sanborn |
| 5,134,014 | A | * | 7/1992  | Zaima et al. ............ 428/186 |
| 5,227,227 | A |   | 7/1993  | Boulanger |
| 5,258,585 | A |   | 11/1993 | Juriga |
| 5,292,577 | A |   | 3/1994  | Van Kerrebrouck et al. |
| 5,298,694 | A |   | 3/1994  | Thompson et al. |
| 5,345,720 | A |   | 9/1994  | Illbruck et al. |
| 5,387,382 | A |   | 2/1995  | Föttinger et al. |
| 5,472,760 | A |   | 12/1995 | Norvell |
| 5,493,081 | A |   | 2/1996  | Manigold |
| 5,503,903 | A | * | 4/1996  | Bainbridge et al. ....... 428/182 |

(Continued)

FOREIGN PATENT DOCUMENTS

DE 3313001 A 10/1984

(Continued)

Primary Examiner—Edgardo San Martin
(74) Attorney, Agent, or Firm—Brooks Kushman P.C.

(57) ABSTRACT

A sound insulation system for use with a vehicle includes a layer of fibrous padding material having a first surface and an opposite second surface. The first surface includes multiple spaced apart recesses. The second surface includes a substantially flat surface portion that extends over two adjacent recesses. The multiple recesses are configured to define multiple voids when the sound insulation system is mounted in the vehicle, thereby enhancing acoustical performance of the sound insulation system.

19 Claims, 2 Drawing Sheets

U.S. PATENT DOCUMENTS

| | | |
|---|---|---|
| 5,532,065 A | 7/1996 | Gübitz et al. |
| 5,554,831 A | 9/1996 | Matsukawa et al. |
| 5,584,144 A | 12/1996 | Hisano |
| 5,585,185 A | 12/1996 | Smith et al. |
| 5,591,289 A | 1/1997 | Souders et al. |
| 5,595,415 A | 1/1997 | Beaulat |
| 5,609,941 A | 3/1997 | Cawthon |
| 5,633,067 A | 5/1997 | Illbruck et al. |
| 5,660,908 A * | 8/1997 | Kelman et al. ............... 428/74 |
| 5,677,027 A | 10/1997 | Masuda et al. |
| 5,766,395 A | 6/1998 | Bainbridge et al. |
| 5,866,235 A | 2/1999 | Frederick et al. |
| 5,884,962 A * | 3/1999 | Mattingly et al. ..... 296/187.05 |
| 5,892,187 A | 4/1999 | Patrick |
| 5,955,174 A * | 9/1999 | Wadsworth et al. ........ 428/181 |
| RE36,323 E | 10/1999 | Thompson et al. |
| RE36,677 E | 5/2000 | Reuben |
| 6,066,388 A | 5/2000 | Van Kerrebrouck |
| 6,145,617 A | 11/2000 | Alts |
| 6,302,466 B1 | 10/2001 | Zwick |
| 6,371,240 B1 | 4/2002 | Hayes et al. |
| 6,382,350 B1 | 5/2002 | Jezewski et al. |
| 6,454,048 B1 | 9/2002 | Alts et al. |
| 6,534,145 B1 | 3/2003 | Boyles |
| 6,602,581 B1 * | 8/2003 | Aneja ........................ 428/182 |
| 2001/0008673 A1 | 7/2001 | Nagata et al. |
| 2003/0029670 A1 | 2/2003 | Smith et al. |
| 2004/0129493 A1 * | 7/2004 | Campbell ................... 181/204 |

FOREIGN PATENT DOCUMENTS

| | | |
|---|---|---|
| DE | 44 04 930 A1 | 8/1995 |
| DE | 196 16 672 A1 | 10/1997 |
| EP | 0 141 415 A2 | 5/1985 |
| FR | 2360420 | 4/1978 |
| GB | 1 582 539 | 1/1981 |
| WO | WO 98/30375 | 7/1998 |
| WO | WO 00/12356 | 3/2000 |
| WO | WO 00/66057 A1 | 11/2000 |

\* cited by examiner

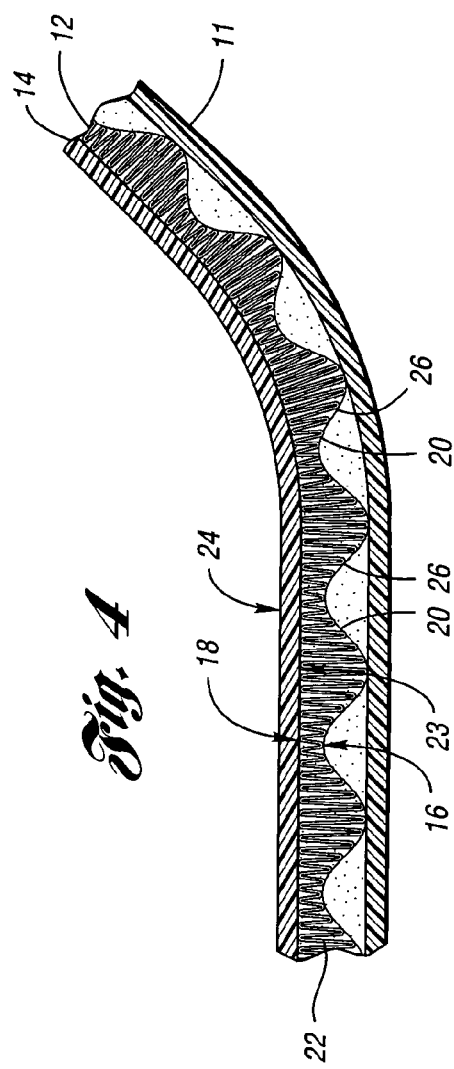
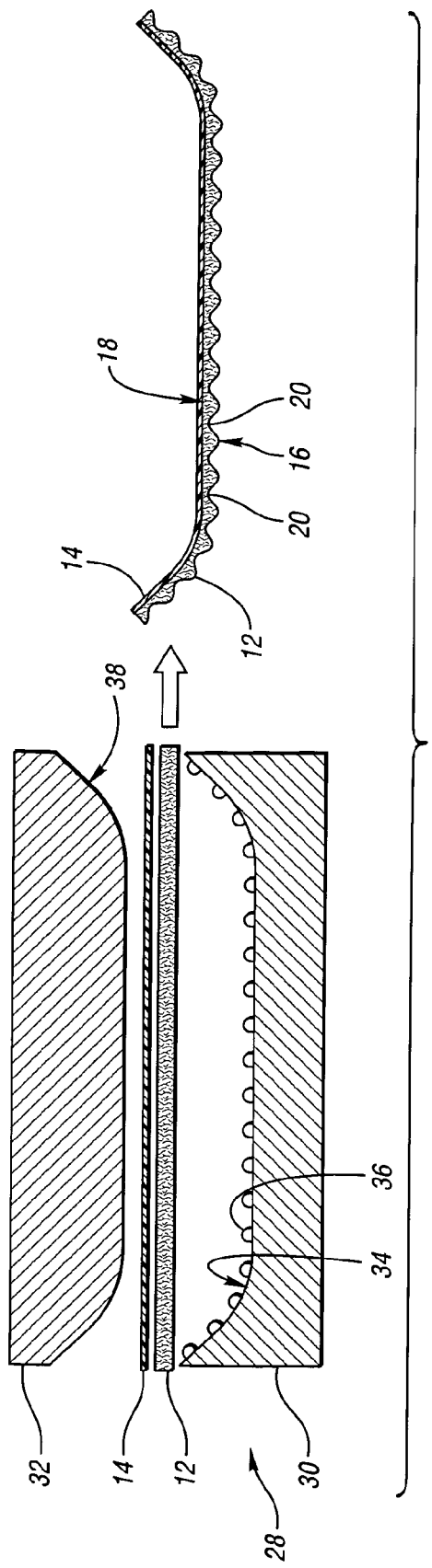

SOUND INSULATION SYSTEM

BACKGROUND OF THE INVENTION

1. Field of the Invention

The present invention generally relates to a sound insulation system and method for forming the sound insulation system for use within the interior compartment of a motor vehicle.

2. Background Art

Recent developments in the area of automotive sound insulation systems, such as flooring systems, include a focus on "lightweight technologies." Current lightweight technologies are known to provide significant reductions in floor system weight compared to traditional sound insulation materials, while also providing improved sound absorption characteristics. These characteristics are attractive to automotive companies because a reduction in the weight of the flooring system improves the fuel economy of a vehicle.

Current flooring systems, however, may not exhibit adequate sound absorption characteristics over certain frequency ranges.

SUMMARY OF THE INVENTION

Under the invention, a sound insulation system for use with a vehicle includes a layer of fibrous padding material having a first surface and an opposite second surface. The first surface includes multiple spaced apart recesses. The second surface has a substantially flat surface portion that extends over two adjacent recesses of the first surface. Also, the multiple recesses are configured to define multiple voids when the sound insulation system is mounted in the vehicle, thereby enhancing acoustical performance of the sound insulation system.

In one embodiment of the present invention, a flooring system for positioning proximate a floor pan of a vehicle comprises a fibrous layer having multiple vertically lapped folds that cooperate to define a first surface and an opposite second surface of the fibrous layer. The first surface is adapted to face toward the floor pan and has multiple recesses. The second surface has a shape that generally conforms with the floor pan. The flooring system also comprises a cover layer attached to the second surface of the fibrous layer. Additionally, the multiple recesses are configured to define multiple voids when the flooring system is mounted in the vehicle, thereby enhancing acoustical performance of the sound insulation system.

A further aspect of the present invention provides a method of forming a sound insulation system for use with a vehicle. The method includes the step of positioning a layer of fibrous padding material that has a first surface and an opposite second surface between first and second mold sections, wherein the first mold section includes a first mold surface having multiple spaced apart projections. The method further includes compressing the layer of fibrous padding material between the mold sections such that the first mold surface forms multiple spaced apart recesses in the first surface of the layer of fibrous padding material. Furthermore, the recesses are configured to define multiple voids when the sound insulation system in installed in the vehicle.

BRIEF DESCRIPTION OF THE DRAWINGS

FIG. 4 is a cross-sectional view of the sound insulation system showing an optional vertically lapped configuration of the fibrous layer; and FIG. 5 is a schematic view of a mold that may be used to manufacture the sound insulation system.

DETAILED DESCRIPTION OF THE PREFERRED EMBODIMENTS

Figure 1:
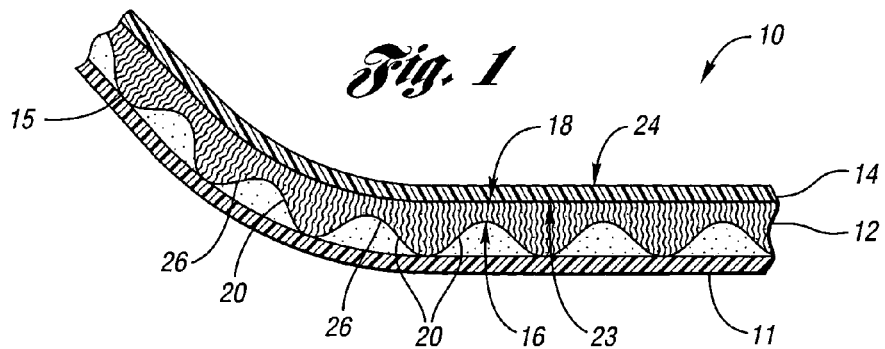
FIG. 1 is a cross-sectional view of a sound insulation system according to the invention positioned on a vehicle part, wherein the sound insulation system includes a fibrous layer and a cover layer attached to the fibrous layer.

FIG. 1 illustrates a section of a sound insulation system 10 according to the invention for use within an interior compartment of a vehicle. In the embodiment shown in FIG. 1, for example, the sound insulation system 10 may be configured as a flooring system that is positioned adjacent to a vehicle part 11, such as a floor pan. Alternatively, the sound insulation system 10 may be configured as a headliner, package shelf covering, door panel lining or covering, trunk compartment liner, engine compartment liner, or any other suitable lining or covering system of the vehicle, and the vehicle part 11 may be a vehicle roof, package shelf, door panel, trunk floor, engine compartment wall, or any other suitable part.

Figure 2:
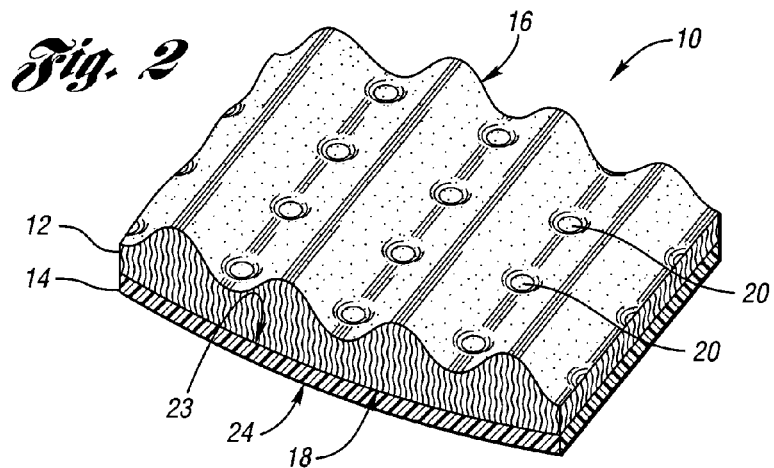
FIG. 2 is a bottom perspective view of a section of the sound insulation system of FIG. 1 showing multiple molded recesses formed in the fibrous layer.

In the embodiment shown in FIGS. 1 and 2, the sound insulation system 10 includes a layer of fibrous padding material, such as fibrous layer 12, and a cover layer 14 attached to the fibrous layer 12. The fibrous layer 12 includes multiple fibers, such as natural fibers, synthetic fibers or a composite of natural and synthetic fibers. Suitable natural fibers include cotton, hemp, wool, silk, jute, ramie, sisal, or the like. Suitable synthetic fibers may include fibers comprising polyester, polypropylene, nylon, glass, ceramic, or the like.

Also, the fibers may be disposed in any suitable arrangement or orientation, such as randomly oriented fibers or systematically arranged fibers. In the embodiment shown in FIG. 1, the fibers are generally vertically oriented and extend generally linearly. Such vertical orientation provides increased compression resistance in the vertical direction. Other suitable fibrous materials may include high-loft fabrics created by a cross-laid or an air-laid process.

Figure 3:
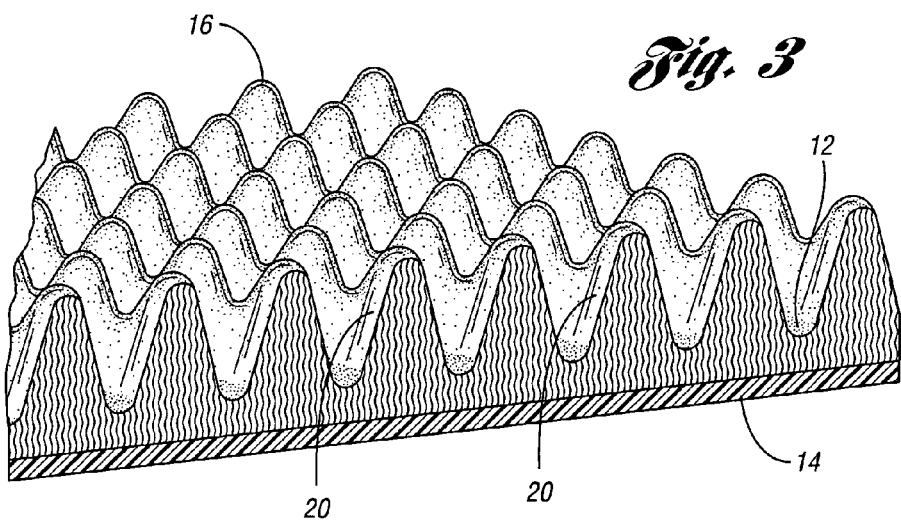
FIG. 3 is a bottom perspective view of the sound insulation system showing the fibrous layer with a cone-shaped peak and valley configuration.

Continuing with FIGS. 1 and 2, the fibrous layer 12 has a first surface 16 configured to face toward the vehicle part 11, and an opposite second surface 18. The first surface 16 has multiple spaced apart recesses 20 that cooperate to provide a convoluted configuration to the first surface 16, such that the first surface 16 has a larger surface area compared to a flat surface and such that the first surface 16 does not conform to the shape of the vehicle part 11. Examples of convoluted configurations include an undulated or wave-like surface as shown in FIGS. 1 and 2, a plurality of peaks and valleys, such as cone-shaped peaks and valleys as shown in FIG. 3, shapes induced by forming the fibrous layer 12 over a mold surface having projections in various configurations or grid patterns, a series of thick and thin sections that approximate quilted patterns, or other patterned configurations.

While the recesses 20 may have any suitable configuration, in one embodiment of the invention, the recesses 20 generally have the same shape and are spaced generally the same distance apart. Additionally, the recesses 20 may have any suitable height or depth, such as a depth of at least 10% of the overall thickness of the fibrous layer 12. In one embodiment of the invention, the recesses 20 each have a depth of at least 25% of the thickness of the fibrous layer 12. In another embodiment of the invention, the recesses 20 each have a depth of at least 75% of the thickness of the fibrous layer 12.

The second surface 18 is adapted to face away from the vehicle part 11, and has a configuration that is substantially different than the first surface 16. In the embodiment shown in FIG. 1, the second surface 18 has a generally flat configuration. More specifically, in the embodiment shown in FIG. 1, the second surface 18 is provided without recesses such that each portion of the second surface 18 that extends over two adjacent recesses 20 formed in the first surface 16 is substantially flat, except for portions of the second surface 18 located at bends in the fibrous layer 12. Moreover, in the embodiment shown in FIG. 1, the second surface 18 may be provided with a shape that generally conforms with the shape of the vehicle part 11.

Referring to FIG. 4, the fibrous layer 12 may be formed to include multiple vertically lapped folds 22 such that the fibrous layer 12 has a corrugated configuration. Adjacent folds 22 may be in contact with each other, or in close spaced relationship, such that the folds 22 cooperate to define the first and second surfaces 16 and 18, respectively. While the folds 22 may be formed in any suitable manner, in one embodiment of the invention, the folds 22 are formed using a pleating machine, such as available from Struto International of Oak Brook, Ill. Additionally, such a folded configuration may provide fibers with a generally vertical orientation, as explained below in detail.

The fibrous layer 12 may also comprise thermal binder fibers for bonding together the fibers of the fibrous layer 12 and for maintaining a desired molded shape of the fibrous layer 12. If the fibrous layer 12 includes folds 22, such binder fibers may also be used to bond adjacent folds 22 together. Alternatively, the fibrous layer may be bonded with polymerized phenolic resin.

Returning to FIG. 1, the cover layer 14 may include any suitable layer or layers. For example, the cover layer 14 may include an air-permeable fabric or carpet layer comprising natural and/or synthetic fibers. As a more detailed example, the cover layer 14 may include tufted nylon fibers woven into or otherwise connected to a backing, such as a spun polyester backing, or non-woven fibers that are needle-punched together.

The cover layer 14 has a first surface, such as concealable surface 23, that is configured to face toward the vehicle part 11, and a second surface, such as appearance surface 24, that is configured to face away from the vehicle part 11. As shown in FIGS. 1 and 4, the concealable surface 23 is attached to the second surface 18 of the fibrous layer 12.

The concealable surface 23 of the cover layer 14 may be attached to the second surface 18 of the fibrous layer 12 in any suitable manner, such as with an adhesive. For example, the adhesive may comprise an adhesive powder and/or a thermoplastic film layer, such as an extruded thermoplastic layer or a sintered thermoplastic layer.

Alternatively, the sound insulation system 10 may be provided without a cover layer if not required for a particular application. For example, the cover layer 14 may be omitted if the sound insulation system 10 is installed inside of a door panel.

When the sound insulation system 10 is installed in the vehicle, the recesses 20 of the fibrous layer 12 define multiple voids 26. This configuration has been shown to significantly enhance acoustical performance of the sound insulation system 10 as compared with prior systems. Referring to Table 1 below, the sound absorption properties of a sample of a convoluted fibrous layer according to one embodiment of the invention are compared to a sample of a standard, conventional fibrous padding material at frequencies ranging from 50–6300 Hz.

TABLE 1

Sound Absorption of a Standard Fibrous Padding Compared to a Convoluted Fibrous Layer of the Invention.

| Frequency | Sound Absorption Coefficient | |
| --- | --- | --- |
| Hz | Standard Fibrous Padding | Convoluted Fibrous Padding |
| 50 | −0.012 | 0.005 |
| 63 | 0.003 | 0.01 |
| 80 | 0.018 | 0.02 |
| 100 | 0.017 | 0.015 |
| 125 | 0.023 | 0.005 |
| 160 | 0.046 | 0.038 |
| 200 | 0.048 | 0.034 |
| 250 | 0.05 | 0.046 |
| 315 | 0.069 | 0.06 |
| 400 | 0.08 | 0.062 |
| 500 | 0.097 | 0.084 |
| 630 | 0.112 | 0.101 |
| 800 | 0.128 | 0.125 |
| 1000 | 0.147 | 0.154 |
| 1250 | 0.178 | 0.196 |
| 1600 | 0.211 | 0.24 |
| 2000 | 0.256 | 0.309 |
| 2500 | 0.309 | 0.397 |
| 3150 | 0.393 | 0.507 |
| 4000 | 0.479 | 0.614 |
| 5000 | 0.532 | 0.663 |
| 6300 | 0.579 | 0.692 |

Testing of the samples was performed in accordance with ASTM C384: Standard Test Method for Impedance and Absorption of Acoustical Materials by the Impedance Tube Method. Furthermore, the testing was performed using an impedance tube and signal amplifier manufactured by Bruel & Kjaer of Germany. The data points show that at frequencies of about 1000 Hz and higher, the sample of the fibrous layer of this invention demonstrated higher sound absorption coefficients than the sample of the standard fibrous padding.

Each sample utilized in the test comprised generally the same material, weight and initial thickness. Both test samples included fibrous pads that were 0.75 inches (3.93 cm) in total thickness. While any suitable configuration may be utilized to create a convoluted appearance, the convoluted sample tested was created to include recesses formed in a 28 mm×28 mm grid pattern. The 28 mm×28 mm grid pattern was created by machining equally spaced lines in first and second perpendicular directions on a mold surface. Pegs were then placed at intersections of the machined lines to provide a patterned surface on the convoluted sample. Finally, the fibrous layer used to form the convoluted sample was placed on the mold such that its machine direction was perpendicular to the first direction.

Referring to FIG. 5, a method for making the sound insulation system 10 will now be described. While the sound insulation system 10 may be manufactured utilizing any suitable apparatus and process, FIG. 5 shows a mold 28 that may be used with a compression molding process. Mold 28 includes first and second mold sections 30 and 32, respectively. The first mold section 30 includes a first mold surface 34 having multiple spaced apart projections 36 that are used to form the recesses 20. In one embodiment of the invention, the projections 36 are pegs that each have an octagonal cross-section. Alternatively, the projections 36 may have any suitable configuration, such as cylindrical pegs, cone-shaped pegs, pyramid-shaped pegs, or wedge-shaped pegs, that have circular, rectangular or triangular cross-sections. As another example, the projections 36 may comprise elongated members or bars with any suitable configuration, such as circular bars or rectangular bars for forming the recesses 20 as elongated valleys or grooves. Additional spaced-apart projections may also be formed on such bars for forming smaller recesses.

In the embodiment shown in FIG. 5, the second mold section 32 is provided with a generally flat second mold surface 38 that does not include any recess-forming projections. Alternatively, the second mold surface 38 may include one or more projections, recesses, or other features.

Under the method of the invention, the fibrous layer 12 may first be formed in any suitable manner. For example, fibers may be randomly oriented, such as by an air-laid high loft process, to form the fibrous layer 12. Alternatively, the fibers may be horizontally oriented, such as by a cross-laid high loft process. As another example, a pleating machine (not shown) may be used to vertically or horizontally lap a randomly oriented or systematically arranged fiber layer to form the fibrous layer 12.

In one embodiment of the invention, a card apparatus, such as available from Thibeau of Tourcoing Cedex, France, may be used to comb or otherwise arrange fibers in a particular direction, such as a machine direction, to form a relatively thin fiber layer. A pleating machine may then be used to vertically lap the fiber layer to form the fibrous layer 12. With such a process, fibers of the fibrous layer 12 may be provided with a generally vertical orientation.

Next, referring to FIG. 5, the fibrous layer 12 and the cover layer 14 are positioned between the mold sections 30 and 32 of mold 28. The fibrous layer 12 and cover layer 14 are then compressed between the mold sections 30 and 32 to attach the layers 12 and 14 together and to shape the layers 12 and 14.

The first mold surface 34 is configured to form the recesses 20 in the first surface 16 of the fibrous layer 12 when the layers 12 and 14 are compressed together. Furthermore, in the embodiment shown in FIG. 5, the mold 28 is configured to shape the fibrous layer 12 such that at least a portion of the second surface 18 is formed substantially flat. For example, a portion of the second surface 18 that extends over two adjacent recesses 20 may be formed substantially flat.

An adhesive material, such as an adhesive powder and/or a thermoplastic film layer, may also be positioned between the fibrous layer 12 and the cover layer 14 prior to compressing the layers together to facilitate attachment of the layers 12 and 14. Moreover, the fibrous layer 12 may comprise thermal or phenolic binders for binding together the fibers of the fibrous layer 12 and for maintaining the molded shape of the fibrous layer 12.

Furthermore, the fibrous layer 12 and/or cover layer 14 may be heated, such as in an oven or by any other suitable means, prior to being positioned between the mold sections 30 and 32. Moreover, the mold sections 30 and 32 may be heated and/or cooled to facilitate the molding process. Alternatively or supplementally, the mold 28 may be configured to introduce a heating fluid, such as hot air or steam, between the mold sections 30 and 32 for heating the layers 12 and/or 14.

As an alternative to the above described process, the cover layer 14 may be molded in a separate molding operation such that the cover layer 14 has a shape that generally conforms to the mold surfaces 34 and 38 prior to being positioned between the mold sections 30 and 32. As yet another alternative, the fibrous layer 12 may be molded in the mold 28 without the cover layer 14, and the cover layer 14 may be subsequently attached to the fibrous layer 12, such as by an additional molding operation. As still yet another alternative, the cover layer 14 may be omitted if not required for a particular application.

Under the method of the invention, the recesses 20 of the fibrous layer 12 cooperate to provide a convoluted configuration to the first surface 16. With such a configuration, surface area of the first surface 16 is significantly increased compared with prior fibrous padding layers. As a result, sound absorption of the sound insulation system 10 is significantly increased compared with prior systems. Furthermore, because the second surface 18 of the fibrous layer 12 is preferably not provided with a convoluted configuration, contact between the fibrous layer 12 and the cover layer 14 may be maximized.

It is noted that sound insulation systems according to the invention may be configured to absorb sounds at various frequency ranges, such as low and/or high frequency ranges. For example, such factors as manufacturing materials, recess configuration, and airflow resistance of the fibrous layer and/or cover layer may be designed or chosen to achieve a desired sound absorption characteristic.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sound insulation system for use within a vehicle, the sound insulation system consisting essentially of:
    a layer of fibrous padding material having a first surface and an opposite second surface, the first surface including multiple spaced apart recesses, the second surface having a substantially flat surface portion that extends over two adjacent recesses of the first surface; and
    a cover layer attached to the second surface of the layer of fibrous padding material;
    wherein the recesses of the first surface are configured to define multiple voids when the sound insulation system is mounted in the vehicle, thereby enhancing acoustical performance of the sound insulation system.

2. The sound insulation system of claim 1 wherein the sound insulation system is configured to be positioned proximate a floor pan of the vehicle, and wherein the second surface of the layer of fibrous padding material has a shape that generally conforms with the floor pan.

3. The sound insulation system of claim 1 wherein the layer of fibrous padding material includes multiple generally vertically oriented fibers.

4. The sound insulation system of claim 1 wherein the layer of fibrous padding material includes multiple vertically lapped folds.

5. The sound insulation system of claim 1 wherein the recesses cooperate to provide an undulated configuration to the first surface of the layer of fibrous padding material, the undulated configuration including multiple, generally evenly spaced peaks.

6. The sound insulation system of claim 1 wherein the layer of fibrous padding material has a thickness, and each recess has a depth that is at least ten percent of the thickness.

7. The sound insulation system of claim 1 wherein the layer of fibrous padding material comprises natural fibers.

8. The sound insulation system of claim 1 wherein the layer of fibrous padding material comprises synthetic fibers.

9. A flooring system for positioning proximate a floor pan of a vehicle, the flooring system consisting essentially of:
   a fibrous layer having multiple vertically lapped folds that cooperate to define a first surface and an opposite second surface of the fibrous layer, the first surface being adapted to face toward the floor pan and having multiple recesses, the second surface having a shape that generally conforms with the floor pan, the second surface further having a substantially flat surface portion that extends over at lest two adjacent recesses of the first surface; and
   a cover layer attached to the second surface of the fibrous layer;
   wherein the multiple recesses are configured to define multiple voids when the flooring system is mounted in the vehicle, thereby enhancing acoustical performance of the flooring system.

10. A method of forming a sound insulation system for use within the interior of a vehicle, the method consisting essentially of:
    positioning a layer of fibrous padding material having a first surface and an opposite second surface between first and second mold sections of a mold, the first mold section including a first mold surface having multiple spaced apart projections; and
    compressing the layer of fibrous padding material between the mold sections such that the first mold surface forms multiple spaced apart recesses in the first surface of the layer of fibrous padding material;
    wherein the recesses are configured to define multiple voids when the sound insulation system is installed in the vehicle.

11. The method of claim 10 wherein the layer of fibrous padding material includes multiple generally vertically oriented fibers.

12. The method of claim 10 wherein the recesses cooperate to provide a convoluted configuration to the first surface of the layer of fibrous padding material.

13. The method of claim 10 wherein the second mold section includes a second mold surface, at least a portion of the second mold surface being substantially flat, and wherein the compressing step is performed such that a portion of the second surface of the layer of fibrous padding material that extends over two adjacent recesses of the first surface is formed substantially flat.

14. The method of claim 10 further comprising attaching a cover layer to the second surface of the layer of fibrous padding material.

15. The method of claim 14 wherein the attaching step comprises positioning the cover layer between the first and second mold sections with the layer of fibrous padding material.

16. The method of claim 10 further comprising heating the layer of fibrous padding material prior to the positioning step.

17. The method of claim 10 further comprising heating the layer of fibrous padding material when the layer of fibrous padding material is positioned between the mold sections.

18. The method of claim 10 wherein the layer of fibrous padding material includes multiple vertically lapped folds that cooperate to define the first and second surfaces.

19. The method of claim 10 further comprising lapping a fiber layer to form the layer of fibrous padding material, wherein the lapping step is performed prior to the positioning step.

\* \* \* \* \*